United States Patent [19]

McShane, Jr.

[11] 4,288,577
[45] Sep. 8, 1981

[54] NOVEL URETHANEDIOLS AND POLYURETHANES THEREFROM

[75] Inventor: Herbert F. McShane, Jr., Wilmington, Del.

[73] Assignee: E. I. Du Pont de Nemours and Company, Wilmington, Del.

[21] Appl. No.: 103,577

[22] Filed: Dec. 14, 1979

[51] Int. Cl.$^3$ .................. C08G 18/32; C08G 18/76; C07C 125/07; C07C 125/077
[52] U.S. Cl. .................. 525/453; 252/182; 521/167; 525/457; 528/61; 528/65; 528/85; 560/26
[58] Field of Search .................. 528/61, 65, 85; 525/457, 453; 521/167; 560/26; 252/182

[56] References Cited

U.S. PATENT DOCUMENTS

| | | | |
|---|---|---|---|
| 2,703,810 | 3/1955 | Viard | 560/26 |
| 2,802,022 | 8/1957 | Groszos et al. | 560/26 |
| 4,120,834 | 10/1978 | Fatutto | 560/26 |

FOREIGN PATENT DOCUMENTS

| | | | |
|---|---|---|---|
| 47-38077 | 4/1972 | Japan | |
| 761395 | 11/1956 | United Kingdom | 528/65 |

Primary Examiner—H. S. Cockeram

[57] ABSTRACT

Reaction of a large excess of 1,4-butanediol with methylenebis (4-phenyl isocyanate) gives a mixture of urethanediols which is a suitable curing agent for isocyanate-terminated polyurethane prepolymers, especially prepolymers made from methylenebis (4-phenyl isocyanate) and polyols. It is desirable to have a urethanediol mixture in which at least about 88 weight percent consists of the reaction product of 2 moles of 1,4-butanediol with 1 mole of the diisocyanate, about 10 weight percent of the reaction product of 3 moles of 1,4-butanediol with 2 moles of the diisocyanate, and no more than about 2 weight percent of 1,4-butanediol. The novel cured polyurethanes have higher hardness and better overall physical properties than methylenebis-(4-phenyl isocyanate)-based polyurethanes cured with conventional commercial diols providing "hard" cured products.

8 Claims, No Drawings

NOVEL URETHANEDIOLS AND POLYURETHANES THEREFROM

BACKGROUND OF THE INVENTION

This invention relates to low-molecular weight urethanediols obtained by a reaction of methylenebis(4-phenyl isocyanate) with 1,4-butanediol and to their use as components in polyurethane formulation either as "hard segment" components or as curing agents.

Methylenebis(4-phenyl isocyanate), sometimes referred to as MDI throughout this disclosure, is a known commercial starting material for the preparation of polyurethanes having desirable physical properties. While such MDI-based prior art polyurethanes have found numerous applications in molded articles and coatings, they were not adequate in those applications where high hardness was desired, for example, in floor finishes. It had been a common practice in the past to use polyamines, especially aromatic polyamines, to cure isocyanate-terminated prepolymers to polyurethane products of high hardness, but this practice has more recently become less acceptable because of the potential toxicity of amine-based curing agents as well as lower hydrolytic stability of polyurethanes containing urea groups. On the other hand, diol- or polyol-based cures were not capable of providing the desired high hardness, except when a large amount of free MDI was present in the isocyanate-terminated prepolymer. However, this resulted in a very vigorous reaction accompanied by large heat evolution, which caused cured, fabricated articles (especially those of larger thicknesses) to be nonhomogeneous and thus frequently unsatisfactory. It, therefore, is an object of the present invention to provide diol-based polyurethane curing agents which would give cured products of high hardness.

SUMMARY OF THE INVENTION

According to this invention, there are provided urethanediols resulting from a reaction of methylenebis(4-phenyl isocyanate) with 1,4-butanediol (hereafter, BDO), having the following respective formulas (1) and (2):

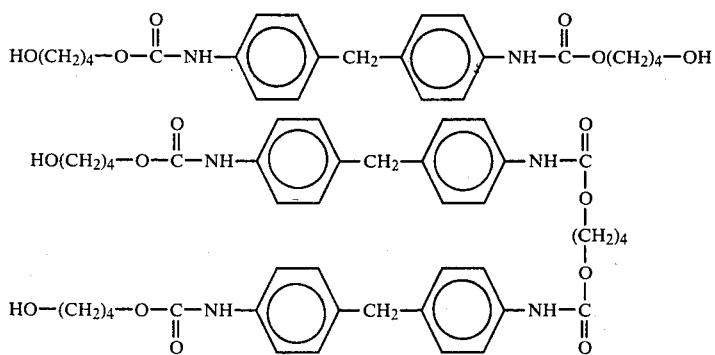

which diols are excellent polyurethane "hard segment" components, especially suitable for curing MDI-based isocyanate-terminated prepolymers.

DETAILED DESCRIPTION OF THE INVENTION

The urethanediols of this invention are made by a reaction of MDI with a large excess of BDO. A mole ratio of about 16:1 BDO/MDI is recommended. At higher ratios the energy required to remove excess BDO may be impractically high, while at significantly lower ratios the proportion of undesirable higher molecular weight polyurethanes increases. A BDO/MDI mole ratio of about 12–20:1 is considered practical. The BDO-MDI condensation is carried out according to techniques well known in the art for the preparation of urethanes. It is practical to maintain the reaction temperature at about 50° C. or more and to provide good agitation. When the recommended mole ratios of BDO and MDI are observed, the reaction product consists mainly of the urethanediol of formula (1) (sometimes referred to as BMB) with less than 10% of the urethanediol of formula (2) (sometimes referred to as BMBMB). More than 10 weight percent of BMBMB in the mixture could raise its apparent melting point above 140° C., and it then would be necessary to carry out costly separation and purification of these products because most industrial equipment used to cure polyurethane prepolymers is designed to operate below 140° C.

The crude reaction product contains a large amount of unchanged BDO, which should be removed. Removal of BDO is a rather sensitive operation because prolonged heating may result in the formation of additional BMBMB. It is, therefore, necessary to use as low a temperature as possible and remove BDO as quickly as possible. Any equipment which can be efficiently operated at a moderate temperature can be used in this step. One can use, for example, a molecular still or a spinning band column, preferably at a reduced pressure. It may also be practical to use two different pieces of equipment, one to remove the bulk of BDO at a reduced pressure and another one to remove most of the remaining small amount of BDO at a high vacuum.

While it is desirable to remove as much of the free BDO as possible, it may not always be possible or practical to reduce the level of free BDO below 1 or 2 weight percent of the distillation residue. It has been observed, nevertheless, that when the proportion of BMBMB in the distillation residue is about 12% or less and the proportion of BDO not over 3%, the cured polyurethane products cured with such a mixture still have an acceptably high hardness. Generally, hardness increases with increasing proportions of BMBMB and decreases with increasing proportions of BDO. When the respective proportions of these two components in a mixture with BMB are 10% and 2% by weight, the resulting hardness of the cured product is about the same as would be obtained with BMB alone. Such a mixture can, therefore, be used as the curing agent without further purification. For all practical purposes, both from the standpoint of the composition's melting point and of the resulting cured polyurethane's hardness, it is possible to use as the curing agent a mixture of about 85-92% of BMB, 8-12% of BMBMB, and 0-3% of BDO. Usual commercial compositions will contain about 88-89% of BMB, 10% of BMBMB, and 1-2% of BDO, all percentages being by weight.

The polyurethane prepolymers normally will be MDI-based prepolymers obtained from MDI and one or more polyols, such as a polyethylene glycol, polypropylene glycol, mixed poly(ethylene) (propylene) glycols, 1,4-butanediol, 1,6-hexanediol, and poly(tetramethylene ether) glycol. Prepolymers based on other polyisocyanates also can be cured with urethanediols of the present invention, but the benefits realized in those cases may not be comparable with those obtained with MDI-based prepolymers since the inadequate hardness problem which the present invention solves has existed particularly with respect to MDI-based polyurethanes.

This invention is now illustrated by the following examples of certain representative embodiments thereof, where all parts, proportions, and percentages are by weight unless otherwise indicated.

THE SYNTHESIS AND PURIFICATION OF BMB AND BMBMB

An excess of BDO is used to keep the amount of BMBMB and higher oligomers to less than about 10%. The BDO/MDI mole ratio is about 16:1.

Thus, 1660 g of dried BDO is placed in a 5-liter, 4-necked flask fitted with a thermometer, 3-way stopcock for nitrogen purge and blanket, and a mechanical agitator. Then, about 288 g of molten (about 45° C.) MDI is added to the BDO (at about 20° C.) with stirring. The mixture is stirred and heated to about 50° C. The heating is discontinued, and the temperature is allowed to increase to about 110° C. Cooling (or heating) may be applied as necessary to control the temperature. The mixture is allowed to react at 100° C. for at least one hour, and it is stripped of excess BDO at a pressure of less than 1 mm Hg and at a pot temperature of up to 135° C. A rotary evaporator and an oil bath may be used.

The molten residue is poured into pans to solidify as a thin layer and, when cool, is broken up. This is a crude BMB/BMBMB mixture. It can be analyzed for BMB and BMBMB content by using size exclusion liquid chromatography. This can be conveniently done using four columns filled with Waters Associates' Poragel ® polystyrene gel having the following pore sizes: 50 nm, 25 nm, 10 nm and 6 nm. Tetrahydrofuran constitutes the liquid phase.

To obtain pure BMB, the crude mixture is dissolved in boiling ethanol and allowed to crystallize. The first crop usually is rich in BMBMB, and the mother liquor is usually depleted in BMBMB and may contain fairly pure BMB. By successive fractional crystallizations from boiling ethanol (relatively high solubility of BMBMB); boiling methanol (intermediate solubility); and/or boiling acetone (low solubility), one separates pure BMB (mp 134.2°-0.5° C.) from pure BMBMB (mp 194.8°-5.0° C. with dec.). BMB has been observed to be polymorphic. While certain crops of pure BMB melt at about 134° C., others melt at about 123° C. The melting points of both BMB and BMBMB are taken in a glass capillary in a well-stirred oil bath heated at a relatively fast rate to within a few degrees of the previously estimated melting temperatures, the final heating being done at a rate of 1° C. per 10 minutes.

| | BMB Analysis | | | |
|---|---|---|---|---|
| | % C | % H | % N | OH No. |
| Calculated | 64.17 | 7.03 | 6.51 | 260.7 |
| Found | 64.55 | 7.39 | 6.44 | 263 |
| | BMBMB Analysis | | | |
| | % C | % H | % N | |
| Calculated | 65.44 | 6.54 | 7.27 | |
| Found | 65.50 | 6.44 | 7.08 | |

Melting points of BMB/BMBMB mixtures are determined as follows:

The mixtures are made by weight, mixed well as powders, transferred to a capillary melting point tube, heated to 170° C. to melt the powders completely and allowed to cool and solidify. Then the melting point is taken. Because of polymorphism, effects of rates of solution of crystals in the melt, and of strong tendencies of melts to supercool, these melting points are considered to be "apparent," rather than true. They are shown below:

| Wt. % BMB | Wt. % BMBMB | Observed MP °C. |
|---|---|---|
| 0 | 100 | [195][a] |
| 77 | 23 | 154 |
| 85.5 | 14.5 | 143 |
| 90.2 | 9.8 | 119 (130)[b] |
| 100 | 0 | 123 (134)[b] |

[a]True melting point. Due to apparent decomposition of liquid, it is undesirable to melt and remelt.
[b]Because of polymorphism of BMB, two sets of values are obtained.

Instead of preparing the BMB/BMBMB mixture by reaction of MDI with a large excess of BDO, it is possible to work with a smaller excess of BDO (e.g., BDO/MDI mole ratio of 10:1 or less). Under such conditions, the proportion of BMBMB formed in the reaction is larger than 10%, but the solubility of BMBMB in molten BMB is only about 10% at 135° C. After BDO is evaporated from the reaction mixture, as described before, excess BMBMB can be removed by filtering the hot residue. The filtrate contains BMB and BMBMB in the desired proportions.

PREPARATION OF POLYURETHANES FOR TESTING

A. Sample A

A prepolymer was prepared from 1 mole of polytetramethylene ether glycol having a number average molecular weight of 1000 (PTMEG 1000) and 3 moles MDI. The MDI was heated to 50° C. and added to the PTMEG 1000 at room temperature with stirring. The reaction was allowed to proceed for 3 hours, during which time the temperature was maintained at 80° C. The product was extracted with hexane until essentially no isocyanate was found in the last extract. The NCO value of the extracted and degassed prepolymer was 5.0%. A 222.2 g prepolymer sample was placed in a standard polymer flask. The material was heated to 93° C. and degassed at 1 mm Hg. Then, 12.0 g of dry 1,4-butanediol was added from a syringe to the prepolymer at atmospheric pressure. The materials were mixed and degassed at 5 mm Hg. Stirring was stopped, and nitrogen was introduced into the flask, maintained at 67° C., to provide a blanket. The fluid mass was poured into clean, silicone-greased molds preheated to 105° C. The molds and their contents were then heated to 105° C. for 24 hours in a nitrogen-swept oven. The test samples were removed from the molds and placed in either open jars or closed jars with wet cloths. Both sets of samples were conditioned for seven days at 25° C. and either 50% relative humidity (open jar) or 100% relative humidity (closed jar).

Sample B

A 47.2 g sample of purified, sieved (less than 200 mesh) BMB (mp 134.2°–5° C.) and 183 g of the above-described MDI-PTMEG 1000 prepolymer were added to a standard polymer flask. The two components were mixed and degassed at 1 mm Hg. The resultant paste was heated to 85° C. with vigorous stirring. Heating was stopped, and dry nitrogen was introduced into the flask. The product was poured into molds preheated to 105° C., then heated at 105° C. for 23 hours in a nitrogen-swept oven and prepared for testing as described above.

Sample C

A 24.6 g sample of di(β-ethoxy ether) of hydroquinone (HQEE) from Eastman Kodak Co. and 210.0 g of the above-described MDI-PTMEG 1000 prepolymer were reacted using the general techniques described above for Samples A and B. Samples were cured 24 hours at 105° C. and conditioned for testing as described above.

The test results of all three samples are summarized below:

| Sample Curing Agent | A BDO | B BMB | C HQEE* |
|---|---|---|---|
| ASTM Test 412** (25° C., 50% RH) | | | |
| Modulus - $M_{100}$ (MPa) | 4.83 | 14.14 | 11.86 |
| Modulus - $M_{200}$ (MPa) | 6.28 | 14.83 | 12.55 |
| Modulus - $M_{300}$ (MPa) | 11.03 | 16.21 | 13.86 |
| Modulus - $M_{400}$ (MPa) | 21.38 | 20.07 | 16.21 |
| Tensile Strength at Break - $T_B$ (MPa) | 32.76 | 27.59 | 26.07 |
| Elongation at Break $E_B$ (%) | 450 | 500 | 580 |
| ASTM Test D470 | | | |
| Tear at 25° C. (kN/m) | 7.88 | 34.85 | 26.62 |
| Tear at 70° C. (kN/m) | 3.33 | 21.02 | about 7.0 |
| ASTM Test D2240 | | | |
| 25° C. Hardness - Shore A | 81 | 93 | 88 |
| 25° C. Hardness - Shore D | 37 | 54 | 48 |
| ASTM Test D395 | | | |
| Compression Set, Method B 22 hours at 70° C. (%) | 56 | 35 | 30 |
| ASTM D2632-74 | | | |
| Bashore Rebound Resilience (%) | 47 | 48 | 40 |
| ASTM Test D1043 | | | |
| Clash - Berg $T_4$ (°C.) | −39.6 | −27.4 | −40.3 |

*di-β-ethoxyether of hydroquinone
**values are median of three test results

I claim:

1. A composition of matter selected from the group consisting of the urethanediol having the following formula (1)

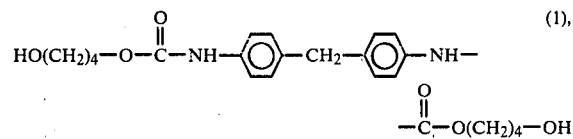

the urethanediol having the following formula (2)

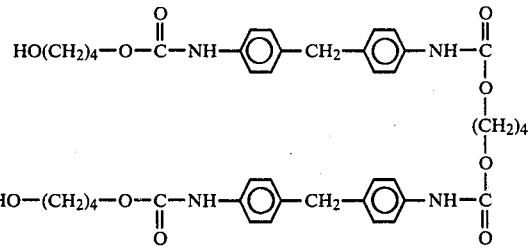

and a mixture of urethanediols having the above formulas (1) and (2).

2. A composition of matter of claim 1 consisting essentially of a mixture of urethanediols of formulas (1) and (2) wherein the urethanediol of formula (2) constitutes about 8–12% of the total weight.

3. A composition of matter of claim 2 wherein, in addition to the urethanediols of formulas (1) and (2), there is also present about 0–3% by weight of 1,4-butanediol.

4. A composition of matter of claim 3 consisting essentially of about 88–89% of the urethanediol of formula (1), about 10% of the urethanediol of formula (2), and about 1–2% of 1,4-butanediol, all percentages being by weight.

5. In a process for curing an isocyanate-terminated polyurethane prepolymer with a diol, the improvement of using as the diol a mixture of about 85–92 weight percent of the diol of formula (1)

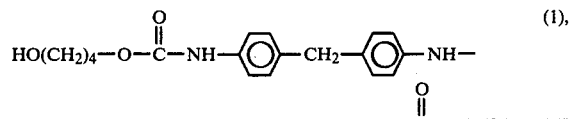

about 8–12 weight percent of the diol of formula (2)

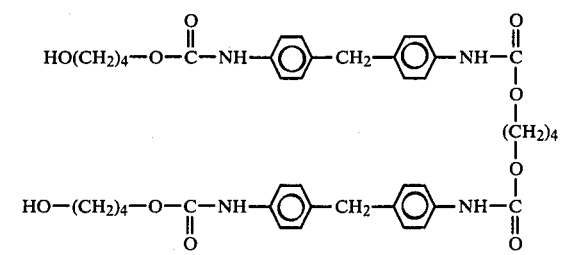

and about 0–3 weight percent of 1,4-butanediol.

6. The improvement of claim 5 wherein the diol of formula (2) is present in the mixture in an amount of about 10 weight percent, and 1,4-butanediol in an amount of at most about 2 weight percent.

7. The improvement of claim 5 wherein the prepolymer is a reaction product of a polyol with methylenebis(4-phenyl isocyanate).

8. A cured polyurethane prepared according to the improved process of claim 7.

* * * * *